(12) United States Patent
Nguyen

(10) Patent No.: US 7,766,099 B2
(45) Date of Patent: *Aug. 3, 2010

(54) METHODS OF DRILLING AND CONSOLIDATING SUBTERRANEAN FORMATION PARTICULATES

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 114 days.

This patent is subject to a terminal disclaimer.

(21) Appl. No.: 12/256,644

(22) Filed: Oct. 23, 2008

(65) Prior Publication Data

US 2009/0095535 A1 Apr. 16, 2009

Related U.S. Application Data

(60) Continuation-in-part of application No. 11/526,181, filed on Sep. 22, 2006, now abandoned, which is a division of application No. 10/650,065, filed on Aug. 26, 2003, now Pat. No. 7,156,194.

(51) Int. Cl.
E21B 7/00 (2006.01)
E21B 33/13 (2006.01)

(52) U.S. Cl. .............................. 175/72; 166/295; 175/64

(58) Field of Classification Search ........................ None
See application file for complete search history.

(56) References Cited

U.S. PATENT DOCUMENTS

| | | | |
|---|---|---|---|
| 3,052,298 A | 9/1962 | Malott | |
| 3,070,165 A | 12/1962 | Stratton | |
| 3,173,484 A | 3/1965 | Huitt et al. | |
| 3,195,635 A | 7/1965 | Fast | |
| 3,302,719 A | 2/1967 | Fischer | |
| 3,308,886 A | 3/1967 | Evans | |
| 3,329,204 A | 7/1967 | Brieger | |
| 3,364,995 A | 1/1968 | Atkins et al. | |
| 3,366,178 A | 1/1968 | Malone et al. | |
| 3,378,074 A | 4/1968 | Kiel | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,525,398 A | 8/1970 | Fisher | |
| 3,565,176 A | 2/1971 | Clifford | |
| 3,592,266 A | 7/1971 | Tinsley | |
| 3,709,641 A | 1/1973 | Sarem | |
| 3,741,308 A | 6/1973 | Veley | |
| 3,769,070 A | 10/1973 | Schilt | |
| 3,850,247 A | 11/1974 | Tinsley | |
| 3,861,467 A | 1/1975 | Harnsberger | |
| 3,933,205 A | 1/1976 | Kiel | |
| 4,000,781 A | 1/1977 | Knapp | |
| 4,018,285 A | 4/1977 | Watkins et al. | |
| 4,060,988 A | 12/1977 | Arnold | |
| 4,068,718 A | 1/1978 | Cooke, Jr. et al. | |
| 4,085,802 A | 4/1978 | Sifferman et al. | |
| 4,089,437 A | 5/1978 | Chutter et al. | |
| 4,247,430 A | 1/1981 | Constien | |
| 4,259,205 A | 3/1981 | Murphey | |
| 4,392,988 A | 7/1983 | Dobson et al. | |
| 4,399,866 A | 8/1983 | Dearth | |
| 4,428,427 A | 1/1984 | Friedman | |
| 4,441,556 A | 4/1984 | Powers et al. | |
| 4,669,543 A | 6/1987 | Young | |
| 4,670,501 A | 6/1987 | Dymond et al. | |
| 4,681,165 A | 7/1987 | Bannister | |
| 4,772,646 A | 9/1988 | Harms et al. | |
| 4,777,200 A | 10/1988 | Dymond et al. | |
| 4,842,070 A | 6/1989 | Sharp | |
| 4,875,525 A | 10/1989 | Mana | |
| 4,892,147 A | 1/1990 | Jennings, Jr. et al. | |
| 4,898,750 A | 2/1990 | Friedman et al. | |
| 4,921,576 A | 5/1990 | Hurd | |
| 4,984,635 A | 1/1991 | Cullick et al. | |
| 5,005,647 A | 4/1991 | Friedman et al. | |
| 5,056,597 A | 10/1991 | Stowe, III et al. | |
| 5,095,987 A | 3/1992 | Weaver et al. | |

(Continued)

FOREIGN PATENT DOCUMENTS

| | | |
|---|---|---|
| EP | 0506934 | 10/1992 |
| EP | 1607572 | 12/2005 |
| GB | 2298440 | 9/1996 |
| WO | WO 2004/009956 | 1/2004 |
| WO | WO 2004/083600 | 9/2004 |
| WO | WO2004090281 | 10/2004 |
| WO | WO2004104368 | 12/2004 |
| WO | WO2005080749 | 9/2005 |

OTHER PUBLICATIONS

U.S. Appl. No. 12/080,647, filed Apr. 4, 2008, Dalrymple et al.
"Santrol Bioballs"; http://www.fairmounminerals.com/.sub.—SANTROL/SANTROL%20Web%20Site/B.sub- .—TD.htm. cited by other, Sep. 30, 2004.
International Search Report and Opinion (PCT/GB2004/002412), Sep. 16, 2004.

(Continued)

Primary Examiner—Zakiya W. Bates
(74) Attorney, Agent, or Firm—Robert A. Kent

(57) ABSTRACT

The present invention relates to improved methods for drilling well bores penetrating producing zones while controlling formation particulates. Some embodiments of the present invention provide methods of consolidating formation particulates surrounding a well bore comprising the steps of providing a drilling composition comprising a drilling fluid and a consolidating material, using the drilling composition to drill at least a portion of the well bore, allowing the consolidating material in the drilling composition to penetrate into the walls of the well bore, and allowing the consolidating material in the drilling composition to consolidate at least a portion of the formation particulates surrounding the well bore.

18 Claims, No Drawings

U.S. PATENT DOCUMENTS

| | | |
|---|---|---|
| 5,244,362 A | 9/1993 | Conally et al. |
| 5,249,627 A | 10/1993 | Harms et al. |
| 5,265,678 A | 11/1993 | Grundmann |
| 5,278,203 A | 1/1994 | Harms |
| 5,377,756 A | 1/1995 | Northrop et al. |
| 5,390,741 A | 2/1995 | Payton et al. |
| 5,403,822 A | 4/1995 | Mueller et al. |
| 5,420,174 A | 5/1995 | Dewprashad |
| 5,492,177 A | 2/1996 | Yeh et al. |
| 5,492,178 A | 2/1996 | Nguyen et al. |
| 5,663,123 A | 9/1997 | Goodhue, Jr. et al. |
| 5,697,448 A | 12/1997 | Johnson |
| 5,701,956 A | 12/1997 | Hardy et al. |
| 5,738,136 A | 4/1998 | Rosenberg |
| 5,836,393 A | 11/1998 | Johnson |
| 5,901,789 A | 5/1999 | Donnelly et al. |
| 5,944,106 A | 8/1999 | Dalrymple et al. |
| 5,960,784 A | 10/1999 | Ryan |
| 5,960,878 A | 10/1999 | Nguyen et al. |
| 5,969,823 A | 10/1999 | Wurz et al. |
| 6,063,738 A | 5/2000 | Chatterji et al. |
| 6,070,667 A | 6/2000 | Gano |
| 6,131,661 A | 10/2000 | Conner et al. |
| 6,143,698 A | 11/2000 | Murphey et al. |
| 6,165,947 A | 12/2000 | Chang et al. |
| 6,186,228 B1 | 2/2001 | Wegener et al. |
| 6,302,207 B1 | 10/2001 | Nguyen et al. |
| 6,310,008 B1 | 10/2001 | Rietjens |
| 6,315,040 B1 | 11/2001 | Donnelly |
| 6,328,106 B1 * | 12/2001 | Griffith et al. ............... 166/295 |
| 6,342,467 B1 | 1/2002 | Chang et al. |
| 6,394,181 B2 | 5/2002 | Schnatzmeyer et al. |
| 6,405,796 B1 | 6/2002 | Meyer et al. |
| 6,415,509 B1 | 7/2002 | Echols et al. |
| 6,422,183 B1 | 7/2002 | Kato |
| 6,450,260 B1 | 9/2002 | James et al. |
| 6,457,518 B1 | 10/2002 | Castano-Mears et al. |
| 6,478,092 B2 | 11/2002 | Voll et al. |
| 6,488,763 B2 | 12/2002 | Brothers et al. |
| 6,510,896 B2 | 1/2003 | Bode et al. |
| 6,520,255 B2 | 2/2003 | Tolman et al. |
| 6,534,449 B1 | 3/2003 | Gilmour et al. |
| 6,536,939 B1 | 3/2003 | Blue |
| 6,550,959 B2 | 4/2003 | Huber et al. |
| 6,588,926 B2 | 7/2003 | Huber et al. |
| 6,588,928 B2 | 7/2003 | Huber et al. |
| 6,609,578 B2 | 8/2003 | Patel et al. |
| 6,677,426 B2 | 1/2004 | Noro et al. |
| 6,705,440 B2 | 3/2004 | Nugyen et al. |
| 6,725,930 B2 | 4/2004 | Boney et al. |
| 6,729,405 B2 | 5/2004 | DiLullo et al. |
| 6,776,235 B1 | 8/2004 | England |
| 6,832,655 B2 | 12/2004 | Ravensbergen et al. |
| 6,837,309 B2 | 1/2005 | Boney et al. |
| 6,866,099 B2 | 3/2005 | Nguyen |
| 6,881,709 B2 | 4/2005 | Nelson et al. |
| 6,962,200 B2 | 11/2005 | Nguyen et al. |
| 6,997,259 B2 | 2/2006 | Nguyen |
| 7,008,984 B2 | 3/2006 | Schneider |
| 7,013,976 B2 | 3/2006 | Nguyen et al. |
| 7,017,665 B2 | 3/2006 | Nguyen |
| 7,025,134 B2 | 4/2006 | Byrd et al. |
| 7,028,774 B2 | 4/2006 | Nguyen et al. |
| 7,032,667 B2 | 4/2006 | Nguyen et al. |
| 7,036,589 B2 | 5/2006 | Nguyen |
| 7,040,403 B2 | 5/2006 | Nguyen et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,080,688 B2 | 7/2006 | Todd et al. |
| 7,081,439 B2 | 7/2006 | Sullivan et al. |
| 7,093,658 B2 | 8/2006 | Chatterji et al. |
| 7,104,325 B2 | 9/2006 | Nguyen et al. |
| 7,114,560 B2 | 10/2006 | Nguyen et al. |
| 7,114,570 B2 | 10/2006 | Nguyen et al. |
| 7,117,942 B2 | 10/2006 | Dalrymple et al. |
| 7,131,491 B2 | 11/2006 | Blauch et al. |
| 7,153,575 B2 | 12/2006 | Anderson et al. |
| 7,156,194 B2 | 1/2007 | Nguyen |
| 7,178,596 B2 | 2/2007 | Blauch et al. |
| 7,204,311 B2 | 4/2007 | Welton et al. |
| 7,210,528 B1 | 5/2007 | Brannon et al. |
| 7,216,711 B2 | 5/2007 | Nguyen et al. |
| 7,252,146 B2 | 8/2007 | Slabaugh et al. |
| 7,261,156 B2 | 8/2007 | Nguyen et al. |
| 7,264,051 B2 | 9/2007 | Nguyen et al. |
| 7,264,052 B2 | 9/2007 | Nguyen et al. |
| 7,267,717 B2 | 9/2007 | Watanabe et al. |
| 7,273,099 B2 | 9/2007 | East, Jr. et al. |
| 7,281,581 B2 | 10/2007 | Nguyen et al. |
| 7,306,037 B2 | 12/2007 | Nguyen et al. |
| 7,343,973 B2 | 3/2008 | Dusterhoft et al. |
| 7,345,001 B2 | 3/2008 | Nguyen et al. |
| 7,347,264 B2 | 3/2008 | Nguyen |
| 2002/0036088 A1 | 3/2002 | Todd |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0013871 A1 | 1/2003 | Mallon et al. |
| 2003/0106690 A1 | 6/2003 | Boney et al. |
| 2003/0114317 A1 | 6/2003 | Benton et al. |
| 2003/0230431 A1 | 12/2003 | Reddy et al. |
| 2004/0040712 A1 | 3/2004 | Ravi et al. |
| 2004/0043906 A1 | 3/2004 | Heath et al. |
| 2004/0045712 A1 | 3/2004 | Eoff et al. |
| 2004/0060702 A1 | 4/2004 | Kotlar et al. |
| 2004/0152602 A1 | 8/2004 | Boles |
| 2004/0194960 A1 | 10/2004 | Nguyen et al. |
| 2004/0261993 A1 | 12/2004 | Nguyen |
| 2004/0261999 A1 | 12/2004 | Nguyen |
| 2005/0000694 A1 | 1/2005 | Dalrymple et al. |
| 2005/0028976 A1 | 2/2005 | Nguyen |
| 2005/0028979 A1 | 2/2005 | Brannon et al. |
| 2005/0034865 A1 | 2/2005 | Todd et al. |
| 2005/0126780 A1 | 6/2005 | Todd et al. |
| 2005/0139359 A1 | 6/2005 | Maurer et al. |
| 2005/0178551 A1 | 8/2005 | Tolman et al. |
| 2005/0194135 A1 | 9/2005 | Nguyen et al. |
| 2005/0194136 A1 | 9/2005 | Nguyen et al. |
| 2005/0194140 A1 | 9/2005 | Dalrymple et al. |
| 2005/0207001 A1 | 9/2005 | Laufer et al. |
| 2005/0257929 A1 | 11/2005 | Nguyen et al. |
| 2005/0267001 A1 | 12/2005 | Weaver et al. |
| 2005/0269101 A1 | 12/2005 | Stegent et al. |
| 2005/0274520 A1 | 12/2005 | Nguyen et al. |
| 2005/0284632 A1 | 12/2005 | Dalrymple et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0089266 A1 | 4/2006 | Dusterhoft et al. |
| 2006/0113078 A1 | 6/2006 | Nguyen et al. |
| 2006/0124303 A1 | 6/2006 | Nguyen et al. |
| 2006/0124309 A1 | 6/2006 | Nguyen et al. |
| 2006/0137875 A1 | 6/2006 | Dusterhoft et al. |
| 2006/0157243 A1 | 7/2006 | Nguyen |
| 2006/0175058 A1 | 8/2006 | Nguyen |
| 2006/0219405 A1 | 10/2006 | Nguyen et al. |
| 2006/0219408 A1 | 10/2006 | Nguyen et al. |
| 2006/0234874 A1 | 10/2006 | Eoff et al. |
| 2006/0240994 A1 | 10/2006 | Eoff et al. |
| 2006/0240995 A1 | 10/2006 | Rickman et al. |
| 2006/0260810 A1 | 11/2006 | Weaver et al. |

| | | | |
|---|---|---|---|
| 2006/0260813 | A1 | 11/2006 | Welton et al. |
| 2006/0264332 | A1 | 11/2006 | Welton et al. |
| 2006/0266522 | A1 | 11/2006 | Eoff et al. |
| 2006/0283592 | A1 | 12/2006 | Sierra et al. |
| 2006/0289160 | A1 | 12/2006 | van Batenburg et al. |
| 2007/0007010 | A1 | 1/2007 | Welton et al. |
| 2007/0012445 | A1 | 1/2007 | Nguyen et al. |
| 2007/0114032 | A1 | 5/2007 | Stegent et al. |
| 2007/0131422 | A1 | 6/2007 | Gatlin et al. |
| 2007/0131425 | A1 | 6/2007 | Gatlin et al. |
| 2007/0267194 | A1 | 11/2007 | Nguyen et al. |
| 2008/0006406 | A1 | 1/2008 | Nguyen et al. |
| 2009/0205830 | A1 | 8/2009 | Nguyen |

OTHER PUBLICATIONS

International Search Report and Opinion (PCT/GB2005/003845), Jul. 31, 2006.
International Search Report and Opinion (PCT/GB2005/004009), Jan. 11, 2006.
International Search Report (CPW 21582 EP), Mar. 11, 2005.
International Search Report and Opinion (PCT/GB2004/001497), Jul. 20, 2004.
International Search Report and Opinion (PCT/GB2004/001842), Dec. 10, 2004.
International Search Report and Opinion (PCT/GB2004/002674), Dec. 16, 2004.
International Search Report and Opinion (PCT/GB2004/002968), Nov. 16, 2004.
International Search Report and Opinion (PCT/GB2004/004242), Feb. 10, 2005.
International Search Report and Opinion (PCT/GB2004-000689), Jun. 4, 2004.
International Search Report and Opinion (PCT/GB2004/002727), Mar. 11, 2005.
International Search Report and Opinion (PCT/GB2004/002747), Mar. 11, 2005.
International Search Report and Opinion (PCT/GB2005/004010), Feb. 21, 2006.
International Search Report and Opinion (PCT/GB2006/004102), Feb. 20, 2007.
International Search Report and Opinion (PCT/GB2006/004137), Jun. 5, 2008.
International Search Report and Opinion (PCT/GB2006/004852), Mar. 7, 2007.
International Search Report and Opinion (PCT/GB20061000366), Jun. 22, 2006.
International Search Report and Opinion (PCT/GB2005/003747), Dec. 12, 2005.
International Search Report and Opinion (PCT/GB2004/002948), May 24, 2005.
International Search Report and Opinion (PCT/GB2005/000637), Jun. 2, 2005.
International Search Report and Opinion (PCT/GB2005/000634), Aug. 6, 2005.
International Preliminary Report on Patentability (PCT/GB2005/000634), Sep. 14, 2006.
Paccaloni, et al., "Key Factors for Enhanced Results of Matrix Stimulation Treatments," SPE 17154, Feb. 1988.
Paccaloni, et al., "Advances in Matrix Stimulation Technology," SPE 20623, Mar. 1993.
Nguyen, et al., "Controlling Proppant Flowback in High-Temperature, High-Production Wells," SPE 82215, May 2003.
Dusterhoft, et al., "Maximizing Effective Proppant Permeability Under High-Stress, High Gas-Rate Conditions," SPE 90398, Sep. 2004.
Office action from U.S. Appl. No. 10/650,065, Dec. 29, 2005.
Office action from U.S. Appl. No. 10/650,065, Jun. 28, 2008.
Office action from U.S. Appl. No. 10/650,065, Jun. 15, 2006.
"Sanfix A Resin" Halliburton Product Sheet, dated Jan. 2008.

* cited by examiner

METHODS OF DRILLING AND CONSOLIDATING SUBTERRANEAN FORMATION PARTICULATES

CROSS-REFERENCE TO RELATED APPLICATIONS

The present application is a continuation-in-part of U.S. patent application Ser. No. 11/526,181, filed Sep. 22, 2006 now abandoned, which is a divisional of Ser. No. 10/650,065 now U.S. Pat. No. 7,156,194, filed Aug. 26, 2003, which are incorporated by reference herein for all purposes.

BACKGROUND OF THE INVENTION

The present invention relates to methods for drilling and treating well bores. More particularly, the present invention relates to methods for drilling well bores penetrating producing zones while controlling formation particulates.

Often, well bores are drilled into weakly consolidated formations wherein the walls of the well bore may be sensitive to degradation by the force of mobile fluids within the formation. Often, such well bores are subjected to some form of sand control operation, such as gravel packing, to reduce the migration of unconsolidated formation particulates. One common gravel packing operation involves placing a gravel pack screen in the well bore and packing the surrounding annulus between the screen and the well bore with particulates, referred to as "gravel," that have a specific size designed to prevent the passage of formation sand. The gravel pack screen is generally a filter assembly used to, among other things, support and retain the gravel placed during gravel pack operations. A wide range of sizes and screen configurations are available to suit the characteristics of the gravel pack sand used. Similarly, a wide range of sizes of gravel is available to suit the characteristics of the unconsolidated or poorly consolidated particulates in the subterranean formation. The resulting structure presents a barrier to migrating sand from the formation while still permitting fluid flow. When installing the gravel pack, the gravel is carried to the formation in the form of a slurry by mixing the gravel with a transport fluid. Gravel packs act to, among other things, stabilize the formation while causing minimal impairment to well productivity. The gravel, among other things, acts to prevent the particulates from occluding the screen or migrating with the produced fluids, and the screen, among other things, acts to prevent the gravel from entering the production tubing. While gravel packs have been successfully used to control the migration of formation sands, their placement tends to reduce the available diameter of a well bore due to the physical size of the screen and the gravel packed therein.

The screen assembly referred to in the gravel packing operation may also be used as an independent sand control means. Some of the early screen technology dictated that the screens had to be small enough to pass through the smallest diameter of the well bore on the way to its desired placement location where the diameter of the well bore may actually be larger. Developments in technology have lead to deformable and expandable screens such that a relatively small size or small diameter screen may be placed in a desired location along the well bore and then expanded to accommodate the actual size of the well bore at the point of placement.

While the sand control methods mentioned above are routinely used in the completion of well bores, particularly those drilled into weakly consolidated formations, they increase the expense of installing a well bore by requiring separate steps to drill the well bore and then to control the formation sands.

SUMMARY OF THE INVENTION

The present invention relates to methods for drilling and treating well bores. More particularly, the present invention relates to methods for drilling well bores penetrating producing zones while controlling formation particulates.

One embodiment of the methods of the present invention comprises a method of consolidating formation particulates surrounding a well bore comprising the steps of: providing a drilling composition comprising a drilling fluid and a consolidating material; using the drilling composition to drill at least a portion of the well bore; allowing the consolidating material in the drilling composition to penetrate into the walls of the well bore; and allowing the consolidating material in the drilling composition to consolidate at least a portion of the formation particulates surrounding the well bore.

Another method of the present invention comprises a method of consolidating formation particulates surrounding a well bore comprising the steps of: providing a drilling composition comprising a drilling fluid, a consolidating material, and a relative permeability modifier; using the drilling composition to drill at least a portion of the well bore; allowing the consolidating material in the drilling composition to penetrate into the walls of the well bore; and allowing the consolidating material in the drilling composition to consolidate at least a portion of the formation particulates surrounding the well bore.

Another method of the present invention comprises a method of consolidating formation particulates surrounding a well bore comprising the steps of: providing a drilling composition comprising a drilling fluid, a consolidating material comprising a polymerizable organic monomer composition; using the drilling composition to drill at least a portion of the well bore; allowing the consolidating material in the drilling composition to penetrate into the walls of the well bore; and allowing the consolidating material in the drilling composition to consolidate at least a portion of the formation particulates surrounding the well bore.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to methods for drilling and treating well bores. More particularly, the present invention relates to methods for drilling well bores penetrating producing zones while controlling formation particulates.

In some embodiments of the methods of the present invention, a well bore is drilled using a drilling composition comprising a drilling fluid and a consolidating material. The consolidating material is allowed to penetrate into the formation and substantially cure, thus consolidating the formation sands along the wall of the well bore and/or the near well bore area. The methods of the present invention provide, among other things, a means for stabilizing weakly consolidated formations surrounding a well bore during drilling, preventing the formation from collapsing during production, and producing through the treated interval. In some embodiments, the drilling fluids may farther comprise a relative permeability modifier.

I. Suitable Drilling Fluids

Drilling fluids suitable or use in the present invention may be water-based fluids or oil-based invert emulsion fluids.

Essentially any drilling fluid suitable for a drilling application may be used in accordance with the present invention, including aqueous gels, emulsions, and other suitable fluids. Suitable aqueous gels are generally comprised of water and one or more gelling agents and may further comprise weighting agents. Suitable emulsions may be comprised of two immiscible liquids such as an aqueous gelled liquid and a liquefied, normally gaseous fluid, such as nitrogen. In some embodiments of the present invention where the well bore is drilled into a producing zone, the drilling fluid may comprise a drill-in fluid, which is a fluid designed specifically for drilling through the reservoir section of a well bore. Drill-in fluids are often used to, among other thing, minimize damage and maximize production of exposed zones and to facilitate later well completion procedures. Often, additives essential for fluid loss control and cuttings carrying are present in a drill-in fluid. It is within the ability of one skilled in the art, with the benefit of this disclosure, to select a drilling fluid suitable for use in the drilling compositions of the present invention.

Traditional drilling operations add solid particulate matter to the drilling fluid to help control fluid loss to the surrounding formation. In some embodiments of the present invention, use of such additives can be greatly reduced or eliminated due to the fact that the consolidation material added to the drilling fluid may act as a fluid loss control agent. Thus, drilling compositions suitable for use in some embodiments of the present invention comprise only a relatively small amount of particulate fluid loss control material. In some embodiments of the present invention, particularly in those applications where the formation being drilled has a low permeability, e.g. a chalk formation, the drilling fluid composition may contain little or no particulate fluid loss control material. In other embodiments of the present invention, a fluid loss control material may be present in the drilling fluid composition in an amount ranging from 0.1% to about 10% by weight of the overall drilling fluid composition. When used, the particulate fluid loss control material is preferably a material that will degrade in the well bore. Suitable such degradable fluid loss control materials include, but are not limited to, aliphatic polyesters, polylactic acid, poly(lactides), poly(orthoesters) and combinations thereof.

II. Suitable Consolidating Materials

As used herein, the term "consolidating material" refers to any compound suitable for use in subterranean formations and capable of stabilizing at least a portion of a subterranean formation. Suitable consolidating materials may act to at least partially control particulate migration within the subterranean formation. Preferably, the consolidating material enables consolidation or bonding to occur only at the points of contact between particles, and not sealing across the entire area of placement. For example, the consolidating material may attach to particulates within the subterranean formation without completely filling or sealing the porosity of the formation. Suitable such consolidating materials include resins, tackifiers, silyl-modified polyamide compounds, crosslinkable aqueous polymer compositions, consolidating material emulsions, polymerizable monomer compositions, and the like.

Any consolidating fluid known in the art may be used so long as it is soluble in the drilling fluid or it can be dispersed or emulsified into the drilling fluid. Consolidation materials suitable for use in the present invention include, but are not limited to, epoxy-based resins, furan-based resins, phenolic-based resins, phenol/phenol formaldehyde/furfuryl alcohol resins, non-aqueous tackifying materials, aqueous tackifying materials, silyl-modified polyamide compounds, crosslinkable aqueous polymer compositions, consolidating material emulsions and polymerizable monomer compositions. Other suitable consolidating materials are described in U.S. Pat. Nos. 6,196,317, 6,192,986 and 5,836,392, the entire disclosures of which are incorporated by reference herein. Combinations and/or derivatives of these also may be suitable.

The temperature of the subterranean formation being drilled may affect selection of a consolidation material. By way of example, for subterranean formations exhibiting a temperature ranging from about 60° F. to about 250° F., low-temperature epoxy-based resins comprising a hardenable resin component and a hardening agent component containing specific hardening agents may be preferred. For subterranean formations exhibiting a temperature ranging from about 300° F. to about 600° F., a furan-based resin may be preferred. For subterranean formations exhibiting a temperature ranging from about 200° F. to about 400° F., either a phenolic-based resin or a high-temperature epoxy-based resin may be suitable. For subterranean formations exhibiting a temperature of at least about 175° F., a phenol/phenol formaldehyde/furfuryl alcohol resin may also be suitable.

A. Suitable Resins

In some embodiments of the present invention, the consolidating material may comprise a resin. The term "resin" as used herein refers to any of numerous physically similar polymerized synthetics or chemically modified natural resins including thermoplastic materials and thermosetting materials. Resins that may be suitable for use in the present invention may include substantially all resins known and used in the art.

1. Suitable Epoxy-Based Resins

One type of resin suitable for use in the methods of the present invention is a two-component epoxy-based resin comprising a liquid hardenable resin component and a liquid hardening agent component. The liquid hardenable resin component comprises a hardenable resin and an optional solvent. The solvent may be added to the resin to reduce its viscosity for ease of handling, mixing and transferring. It is within the ability of one skilled in the art, with the benefit of this disclosure, to determine if and how much solvent may be needed to achieve a viscosity suitable to the subterranean conditions. Factors that may affect this decision include geographic location of the well, the surrounding weather conditions, and the desired long-term stability of the consolidating material. An alternate way to reduce the viscosity of the hardenable resin is to heat it. The second component is the liquid hardening agent component, which comprises a hardening agent, an optional silane coupling agent, a surfactant, an optional hydrolyzable ester for, among other things, for lowering the pH of the treatment fluid to activate the crosslinking of curable resins, as in the cases of furan based resins, or furfuryl alcohol, and an optional liquid carrier fluid for, among other things, reducing the viscosity of the hardening agent component.

Examples of hardenable resins that can be used in the liquid hardenable resin component include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furan resins, urethane resins, glycidyl ether resins, other epoxide resins, and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, that may be suitable for use in the methods of the present invention include those described in U.S. Pat. No. 6,582,819, issued to McDaniel, et al.; U.S. Pat. No. 4,585,064 issued to Graham, et al.; U.S. Pat. No. 6,677,426 issued to Noro, et al.; and U.S. Pat. No. 7,153,575 issued to Anderson, et al., the entire disclosures of which are herein incorporated by reference.

The hardenable resin may be included in the liquid hardenable resin component in an amount in the range of about 5% to about 100% by weight of the liquid hardenable resin component. It is within the ability of one skilled in the art, with the benefit of this disclosure, to determine how much of the liquid hardenable resin component may be needed to achieve the desired results. Factors that may affect this decision include which type of liquid hardenable resin component and liquid hardening agent component are used.

Any solvent that is compatible with the hardenable resin and achieves the desired viscosity effect may be suitable for use in the liquid hardenable resin component. Suitable solvents may include butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and combinations thereof. Other preferred solvents may include aqueous dissolvable solvents such as, methanol, isopropanol, butanol, and glycol ether solvents, and combinations thereof. Suitable glycol ether solvents include, but are not limited to, diethylene glycol methyl ether, dipropylene glycol methyl ether, 2-butoxy ethanol, ethers of a $C_2$ to $C_6$ dihydric alkanol containing at least one $C_1$ to $C_6$ alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure.

As described above, use of a solvent in the liquid hardenable resin component is optional but may be desirable to reduce the viscosity of the hardenable resin component for ease of handling, mixing, and transferring. However, as previously stated, it may be desirable in some embodiments to not use such a solvent for environmental or safety reasons. It is within the ability of one skilled in the art, with the benefit of this disclosure, to determine if and how much solvent is needed to achieve a suitable viscosity. In some embodiments, the amount of the solvent used in the liquid hardenable resin component may be in the range of about 0.1% to about 30% by weight of the liquid hardenable resin component. Optionally, the liquid hardenable resin component may be heated to reduce its viscosity, in place of, or in addition to, using a solvent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentaamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; and 2-ethyl-4-methyl imidazole; and combinations thereof. The chosen hardening agent often effects the range of temperatures over which a hardenable resin is able to cure. By way of example, and not of limitation, in subterranean formations having a temperature of about 60° F. to about 250° F., amines and cyclo-aliphatic amines such as piperidine, triethylamine, tris(dimethylaminomethyl)phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

In some embodiments, the consolidating material may comprise a liquid hardenable resin component emulsified in a liquid hardening agent component, wherein the liquid hardenable resin component is the internal phase of the emulsion and the liquid hardening agent component is the external phase of the emulsion. In other embodiments, the liquid hardenable resin component may be emulsified in water and the liquid hardening agent component may be present (dispersed or soluble) in the water. In other embodiments, the liquid hardenable resin component may be emulsified in water and the liquid hardening agent component may be provided separately. Similarly, in other embodiments, both the liquid hardenable resin component and the liquid hardening agent component may both be emulsified in water.

The optional silane coupling agent may be used, among other things, to act as a mediator to help bond the resin to formation particulates or proppant particulates. The organosilane coupling agent component of the polymerizable organic monomer compositions generally may comprise any organosilane coupling agent. The term "organosilane coupling agent" as used herein refers to a compound with have at least two reactive groups of different types bonded to a silicon atom. One of the reactive groups of different types is reactive with various inorganic materials such as glass, metals, silica sand and the like and may form a chemical bond with the surface of such inorganic materials; while the other of the reactive group is reactive with various kinds of organic materials and may form a chemical bond with the surface of such organic materials. As a result, organosilane coupling agents are capable of providing chemical bonding between an organic material and an inorganic material.

While any organosilane coupling agent may be used, examples of organosilane silane coupling agents include, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes, aminoethyl-N-beta-(aminoethyl)-gamma-aminopropyl-trimethoxysilanes; gamma-ureidopropyltriethoxysilanes; beta-(3-4 epoxy-cyclohexyl)-ethyl-trimethoxysilane; and gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-β (aminoethyl)-raminopropyl-trimethoxysilane; N-beta (aminoethyl)-raminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; Vinyltrichlorosilane; Vinyltris (βmethoxyethoxy) silane; Vinyltrimethoxysilane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta (aminoethyl)-raminopropyltrimethoxysilane; N-beta (aminoethyl)-raminopropylmethyldimethoxysilane; r-aminopropyltriethoxysilane; N-phenyl-raminopropyltrimethoxysilane; r-mercaptopropyltrimethoxysilane; r-chloropropyltrimethoxysilane and combinations thereof.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Combinations of one or more cationic and nonionic surfactants also may be suitable. Examples of such surfactant combinations are described in U.S. Pat. No. 6,311,773 issued to Todd et al., the entire disclosure of which is incorporated herein by reference. The surfactant or surfactants that may be used are included in the liquid hardening agent component in an amount in the range of about 1% to about 10% by weight of the liquid hardening agent component.

While not required, examples of hydrolyzable esters that may be used in the liquid hardening agent component include, but are not limited to, a combination of dimethylglutarate, dimethyladipate, and dimethylsuccinate; dimethylthiolate; methyl salicylate; dimethyl salicylate; and dimethylsuccinate; and combinations thereof. When used, a hydrolyzable ester is included in the liquid hardening agent component in an amount in the range of about 0.1% to about 3% by weight of the liquid hardening agent component. In some embodiments a hydrolyzable ester is included in the liquid hardening agent component in an amount in the range of about 1% to about 2.5% by weight of the liquid hardening agent component.

Use of a diluent or liquid carrier fluid in the liquid hardening agent component is optional and may be used to reduce the viscosity of the liquid hardening agent component for ease of handling, mixing, and transferring. As previously stated, it may be desirable in some embodiments to not use such a solvent for environmental or safety reasons. Any suitable carrier fluid that is compatible with the liquid hardening agent component and achieves the desired viscosity effects is suitable for use in the present invention. Some suitable liquid carrier fluids are those having high flash points (e.g., about 125° F.) because of, among other things, environmental and safety concerns; such solvents include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, and fatty acid methyl esters, and combinations thereof. Other suitable liquid carrier fluids include aqueous dissolvable solvents such as, for example, methanol, isopropanol, butanol, glycol ether solvents, and combinations thereof. Suitable glycol ether liquid carrier fluids include, but are not limited to, diethylene glycol methyl ether, dipropylene glycol methyl ether, 2-butoxy ethanol, ethers of a $C_2$ to $C_6$ dihydric alkanol having at least one $C_1$ to $C_6$ alkyl group, mono ethers of dihydric alkanols, methoxypropanol, butoxyethanol, and hexoxyethanol, and isomers thereof. Combinations of these may be suitable as well. Selection of an appropriate liquid carrier fluid is dependent on, inter alia, the resin composition chosen.

2. Suitable Non-Epoxy-Based Resins

Other resins suitable for use in the present invention are furan-based resins. Suitable furan-based resins include, but are not limited to, furfuryl alcohol resins, furfural resins, combinations of furfuryl alcohol resins and aldehydes, and a combination of furan resins and phenolic resins. Of these, furfuryl alcohol resins may be preferred. A furan-based resin may be combined with a solvent to control viscosity if desired. Suitable solvents for use in the furan-based consolidation fluids of the present invention include, but are not limited to, 2-butoxy ethanol, butyl lactate, butyl acetate, tetrahydrofurfuryl methacrylate, tetrahydrofurfuryl acrylate, esters of oxalic, maleic and succinic acids, and furfuryl acetate. Of these, 2-butoxy ethanol is preferred. In some embodiments, the furan-based resins suitable for use in the present invention may be capable of enduring temperatures well in excess of 350° F. without degrading. In some embodiments, the furan-based resins suitable for use in the present invention are capable of enduring temperatures up to about 700° F. without degrading.

Optionally, the furan-based resins suitable for use in the present invention may further comprise a curing agent to, among other things, facilitate or accelerate curing of the furan-based resin at lower temperatures. The presence of a curing agent may be particularly useful in embodiments where the furan-based resin may be placed within subterranean formations having temperatures below about 350° F. Examples of suitable curing agents include, but are not limited to, organic or inorganic acids, such as, for example, maleic acid, fumaric acid, sodium bisulfate, hydrochloric acid, hydrofluoric acid, acetic acid, formic acid, phosphoric acid, sulfonic acid, alkyl benzene sulfonic acids such as toluene sulfonic acid and dodecyl benzene sulfonic acid ("DDBSA"), and combinations thereof. In those embodiments where a curing agent is not used, the furan-based resin may cure autocatalytically.

Still other resins suitable for use in the methods of the present invention are phenolic-based resins. Suitable phenolic-based resins include, but are not limited to, terpolymers of phenol, phenolic formaldehyde resins, and a combination of phenolic and furan resins. In some embodiments, a combination of phenolic and furan resins may be preferred. A phenolic-based resin may be combined with a solvent to control viscosity if desired. Suitable solvents for use in the present invention include, but are not limited to butyl acetate, butyl lactate, furfuryl acetate, and 2-butoxy ethanol. Of these, 2-butoxy ethanol may be preferred in some embodiments.

Yet another resin-type material suitable for use in the methods of the present invention is a phenol/phenol formaldehyde/furfuryl alcohol resin comprising of about 5% to about 30% phenol, of about 40% to about 70% phenol formaldehyde, of about 10% to about 40% furfuryl alcohol, of about 0.1% to about 3% of a silane coupling agent, and of about 1% to about 15% of a surfactant. In the phenol/phenol formaldehyde/furfuryl alcohol resins suitable for use in the methods of the present invention, suitable silane coupling agents include, but are not limited to, N-2-(aminoethyl)-3-aminopropyltrimethoxysilane, and 3-glycidoxypropyltrimethoxysilane. Suitable surfactants include, but are not limited to, an ethoxylated nonyl phenol phosphate ester, combinations of one or more cationic surfactants, and one or more nonionic surfactants and an alkyl phosphonate surfactant.

B. Suitable Non-Aqueous Tackifying Materials

In some embodiments of the present invention, the consolidating material may comprise a non-aqueous tackifying material. A particularly preferred group of non-aqueous tackifying materials comprises polyamides that are liquids or in solution at the temperature of the subterranean formation such that they are, by themselves, nonhardening when introduced into the subterranean formation. A particularly preferred product is a condensation reaction product comprised of a commercially available polyacid and a polyamine. Such commercial products include compounds such as combinations of dibasic acids containing some trimers and higher oligomers and also small amounts of monomer acids that are reacted with polyamines. Other polyacids include trimer acids, synthetic acids produced from fatty acids, maleic anhydride, acrylic acid, and the like. Combinations of these may be suitable as well. Such acid compounds are commercially available from companies such as Union Camp, Chemtall, and Emery Industries. The reaction products are available from, for example, Champion Technologies, Inc.

Additional compounds which may be used as non-aqueous tackifying materials include liquids and solutions of, for example, polyesters, polycarbonates, silyl-modified polyamide compounds, polycarbamates, urethanes, natural resins such as shellac, and the like. Combinations of these may be suitable as well.

Other suitable non-aqueous tackifying materials are described in U.S. Pat. Nos. 5,853,048 and 5,833,000, both issued to Weaver, et al. and U.S. Pat. Nos. 7,392,847 and 7,350,579 issued to Gatlin, et al., the entire disclosures of which are herein incorporated by reference.

Non-aqueous tackifying materials suitable for use in the present invention may either be used such that they form a nonhardening coating on a surface or they may be combined with a multifunctional material capable of reacting with the non-aqueous tackifying agent to form a hardened coating. A "hardened coating" as used herein means that the reaction of the tackifying compound with the multifunctional material should result in a substantially non-flowable reaction product that exhibits a higher compressive strength in a consolidated agglomerate than the tackifying compound alone with the particulates. In this instance, the non-aqueous tackifying material may function similarly to a hardenable resin.

C. Suitable Multifunctional Materials

Multifunctional materials suitable for use in the present invention include, but are not limited to, aldehydes; dialdehydes such as glutaraldehyde; hemiacetals or aldehyde releasing compounds; diacid halides; dihalides such as dichlorides and dibromides; polyacid anhydrides; epoxides; furfuraldehyde; aldehyde condensates; and silyl-modified polyamide compounds; and the like; and combinations thereof. Suitable silyl-modified polyamide compounds that may be used in the present invention are those that are substantially self-hardening compositions capable of at least partially adhering to a surface or to a particulate in the unhardened state, and that are further capable of self-hardening themselves to a substantially non-tacky state to which individual particulates such as formation fines will not adhere to, for example, in formation or proppant pack pore throats. Such silyl-modified polyamides may be based, for example, on the reaction product of a silating compound with a polyamide or a combination of polyamides. Other suitable silyl-modified polyamides and methods of making such compounds are described in U.S. Pat. No. 6,439,309, issued to Matherly, et al., the entire disclosure of which is herein incorporated by reference. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In some embodiments of the present invention, the multifunctional material may be mixed with the tackifying compound in an amount of about 0.01% to about 50% by weight of the tackifying compound to effect formation of the reaction product. In other embodiments, the multifunctional material is present in an amount of about 0.5% to about 1% by weight of the tackifying compound. Suitable multifunctional materials are described in U.S. Pat. No. 5,839,510 issued to Weaver, et al., the entire disclosure of which is herein incorporated by reference.

D. Suitable Aqueous Tackifying Materials

Aqueous tackifying materials suitable for use in the present invention are usually not generally significantly tacky when placed onto a particulate, but are capable of being "activated" (e.g., destabilized, coalesced and/or reacted) to transform the compound into a sticky, tackifying compound at a desirable time. Such activation may occur before, during, or after the aqueous tackifier material is placed in the subterranean formation. In some embodiments, a pretreatment may be first contacted with the surface of a particulate to prepare it to be coated with an aqueous tackifier material. Suitable aqueous tackifying materials are generally charged polymers that comprise compounds that, when in an aqueous solvent or solution, will form a nonhardening coating (by itself or with an activator) and, when placed on a particulate, will increase the continuous critical re-suspension velocity of the particulate when contacted by a stream of water. The aqueous tackifier material may enhance the grain-to-grain contact between the individual particulates within the formation (be they proppant particulates, formation fines, or other particulates), helping bring about the consolidation of the particulates into a cohesive, flexible, and permeable mass.

Suitable aqueous tackifying materials include any polymer that can bind, coagulate, or flocculate a particulate. Also, polymers that function as pressure-sensitive adhesives may be suitable. Examples of aqueous tackifying materials suitable for use in the present invention include, but are not limited to: acrylic acid polymers; acrylic acid ester polymers; acrylic acid derivative polymers; acrylic acid homopolymers; acrylic acid ester homopolymers (such as poly(methyl acrylate), poly(butyl acrylate), and poly(2-ethylhexyl acrylate)); acrylic acid ester co-polymers; methacrylic acid derivative polymers; methacrylic acid homopolymers; methacrylic acid ester homopolymers (such as poly(methyl methacrylate), poly(butyl methacrylate), and poly(2-ethylhexyl methacrylate)); acrylamido-methyl-propane sulfonate polymers; acrylamido-methyl-propane sulfonate derivative polymers; acrylamido-methyl-propane sulfonate co-polymers; and acrylic acid/acrylamido-methyl-propane sulfonate co-polymers; derivatives thereof, and combinations thereof. Methods of determining suitable aqueous tackifying materials and additional disclosure on aqueous tackifying materials can be found in U.S. Patent Application Publication No. 2005/0277554 and U.S. Pat. No. 7,131,491, the entire disclosures of which are hereby incorporated by reference.

Some suitable tackifying materials are described in U.S. Pat. No. 5,249,627 by Harms, et al., the entire disclosure of which is incorporated by reference. Harms discloses aqueous tackifying materials that comprise at least one member selected from the group consisting of benzyl coco di-(hydroxyethyl) quaternary amine, p-T-amyl-phenol condensed with formaldehyde, and a copolymer comprising from about 80% to about 100% C1-30 alkylmethacrylate monomers and from about 0% to about 20% hydrophilic monomers. In some embodiments, the aqueous tackifying material may comprise a copolymer that comprises from about 90% to about 99.5% 2-ethylhexylacrylate and from about 0.5% to about 10% acrylic acid. Suitable hydrophilic monomers may be any monomer that will provide polar oxygen-containing or nitrogen-containing groups. Suitable hydrophilic monomers include dialkyl amino alkyl (meth)acrylates and their quaternary addition and acid salts, acrylamide, N-(dialkyl amino alkyl)acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique. Methods of producing these copolymers are disclosed, for example, in U.S. Pat. No. 4,670,501, the entire disclosure of which is incorporated herein by reference.

E. Suitable Crosslinkable Aqueous Polymer Compositions

In other embodiments, the consolidating material comprises crosslinkable aqueous polymer compositions. Generally, suitable crosslinkable aqueous polymer compositions comprise an aqueous solvent, a crosslinkable polymer, and a crosslinking agent. Such compositions are similar to those used to form gelled treatment fluids, such as fracturing fluids, but according to the methods of the present invention, they are not exposed to breakers or de-linkers, and so they retain their viscous nature over time. The aqueous solvent may be any aqueous solvent in which the crosslinkable composition and the crosslinking agent may be dissolved, mixed, suspended, or dispersed therein to facilitate gel formation. For example, the aqueous solvent used may be freshwater, salt water, brine, seawater, or any other aqueous liquid that does not adversely react with the other components used in accordance with this invention or with the subterranean formation.

Examples of crosslinkable polymers that can be used in the crosslinkable aqueous polymer compositions include, but are not limited to, carboxylate-containing polymers and acrylamide-containing polymers. The most suitable polymers are thought to be those that would absorb or adhere to the rock surfaces so that the rock matrix may be strengthened without occupying a lot of the pore space and/or reducing permeability. Examples of suitable acrylamide-containing polymers include polyacrylamide, partially hydrolyzed polyacrylamide, copolymers of acrylamide and acrylate, and carboxylate-containing terpolymers and tetrapolymers of acrylate. Combinations of these may be suitable as well. Additional examples of suitable crosslinkable polymers include hydratable polymers comprising polysaccharides and derivatives thereof, and that contain one or more of the monosaccharide units, galactose, mannose, glucoside, glucose, xylose, arabinose, fructose, glucuronic acid, or pyranosyl sulfate. Suitable natural hydratable polymers include, but are not limited to, guar gum, locust bean gum, tara, konjak, tamarind, starch, cellulose, karaya, xanthan, tragacanth, and carrageenan, and derivatives of all of the above. Combinations of these may be suitable as well. Suitable hydratable synthetic polymers and copolymers that may be used in the crosslinkable aqueous polymer compositions include, but are not limited to, polycarboxylates such as polyacrylates and polymethacrylates; polyacrylamides; methylvinyl ether polymers; polyvinyl alcohols; and polyvinylpyrrolidone. Combinations of these may be suitable as well. The crosslinkable polymer used should be included in the crosslinkable aqueous polymer composition in an amount sufficient to form the desired gelled substance in the subterranean formation. In some embodiments of the present invention, the crosslinkable polymer may be included in the crosslinkable aqueous polymer composition in an amount in the range of from about 1% to about 30% by weight of the aqueous solvent. In another embodiment of the present invention, the crosslinkable polymer may be included in the crosslinkable aqueous polymer composition in an amount in the range of from about 1% to about 20% by weight of the aqueous solvent.

The crosslinkable aqueous polymer compositions of the present invention further comprise a crosslinking agent for crosslinking the crosslinkable polymers to form the desired gelled substance. In some embodiments, the crosslinking agent is a molecule or complex containing a reactive transition metal cation. A most preferred crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV.

The crosslinking agent should be present in the crosslinkable aqueous polymer compositions of the present invention in an amount sufficient to provide, among other things, the desired degree of crosslinking. In some embodiments of the present invention, the crosslinking agent may be present in the crosslinkable aqueous polymer compositions of the present invention in an amount in the range of from about 0.01% to about 5% by weight of the crosslinkable aqueous polymer composition. The exact type and amount of crosslinking agent or agents used depends upon the specific crosslinkable polymer to be crosslinked, formation temperature conditions, and other factors known to those individuals skilled in the art.

Optionally, the crosslinkable aqueous polymer compositions may further comprise a crosslinking delaying agent, such as a polysaccharide crosslinking delaying agent derived from guar, guar derivatives, or cellulose derivatives. The crosslinking delaying agent may be included in the crosslinkable aqueous polymer compositions, among other things, to delay crosslinking of the crosslinkable aqueous polymer compositions until desired. One of ordinary skill in the art, with the benefit of this disclosure, will know the appropriate amount of the crosslinking delaying agent to include in the crosslinkable aqueous polymer compositions for a desired application.

F. Suitable Polymerizable Organic Monomer Compositions

In other embodiments, the consolidating materials useful in the methods of the present invention comprise polymerizable organic monomer compositions. Suitable polymerizable organic monomer compositions comprise an aqueous fluid, a polymerizable organic monomer, and an initiator. In some preferred embodiments, the polymerizable organic monomer compositions may further comprise an oxygen scavenger, an organosilane coupling agent, and/or a crosslinking agent.

In some embodiments, the polymerizable organic monomer compositions may be used in the form of an emulsion wherein the aqueous fluid acts as the continuous phase and the polymerizable organic monomer acts as the internal phase. In embodiments wherein an emulsion is desired, the initiator is preferably included in the aqueous fluid, continuous phase. Suitable emulsions preferably exhibit internal phase particle sizes of about 1 micron or smaller, more preferably, 0.5 microns or smaller.

1. Suitable Aqueous Fluids

Any water-based fluid that does not adversely affect the desired polymerizable organic monomer composition or the subterranean formation may be used as the aqueous fluid. Examples include freshwater, salt water, seawater, and brine (examples of suitable brines include such as aqueous salt solutions of sodium chloride, potassium chloride, ammonium chloride, calcium chloride, and calcium bromide).

2. Suitable Polymerizable Organic Monomers

A variety of monomers are suitable for use as the acid polymerizable monomer. Examples of suitable acid polymerizable monomers include, but are not limited to, furfuryl alcohol; acrylic acid; methacrylic acid; acrylamide; methacrylamide; 2-methacrylamido-2-methylpropane sulfonic acid; dimethylacrylamide; vinyl sulfonic acid; N,N-dimethylaminoethylmethacrylate; 2-triethylammoniumethyl-methacrylate chloride; N,N-dimethyl-aminopropyl-methacryl-amide; methacrylamidepropyltriethylammonium chloride; N-vinyl pyrrolidone, vinyl-phosphonic acid; methacryloyloxyethyl trimethylammonium sulfate; hydroxyethylcellulose-vinyl phosphoric acid and combinations thereof. In some embodiments, it may be desirable to use a self-crosslinking polymerizable organic monomer. Examples of suitable self-crosslinking monomers include, but are not limited to, hydroxyethylacrylate; hydroxymethylacrylate; hydroxyethylmethacrylate; N-hydroxymethylacrylamide; N-hydroxymethyl-methacrylamide; polyethylene glycol acrylate; polyethylene glycol methacrylate; polypropylene glycol acrylate; polypropylene glycol methacrylate; and combinations thereof. Of these, hydroxyethylacrylate and hydroxyethylcellulose-vinyl phosphoric acid may be preferred.

The acid polymerizable monomer (or monomers where a combination thereof is used) should be included in the polymerizable organic monomer composition in an amount sufficient to form the desired gelled substance after placement of the polymerizable organic monomer composition into the subterranean formation. In some embodiments of the present invention, the acid polymerizable monomer may be included in the polymerizable organic monomer composition in an amount in the range of from about 0.1% to about 50% by weight of the aqueous fluid, preferably from about 0.5% to about 30% by weight of the aqueous fluid, and preferably from about 1% to about 10% by weight of the aqueous fluid.

3. Suitable Initiators

Any compound that forms free radicals in aqueous solution such that the radicals can initiate polymerization of the water-soluble polymerizable organic monomer(s) may be used as the initiator. Compounds suitable for use as the primary initiator include, but are not limited to, alkali metal persulfates; peroxides; oxidation-reduction systems employing reducing agents (such as sulfites in combination with oxidizers); acid initiators (such as maleic anhydride, phthalic anhydride, maleic acid, malic acid, phthalic acid, trichloroacetic acid, formic acid, oxalic acid, sulfonic acid, sulfamic acid, glycolic acid); and azo polymerization initiators (such as 2,2'-azobis (2-imidazole-2-hydroxyethyl) propane, 2,2'-azobis(2-aminopropane), 4,4'-azobis(4-cyanovaleric acid), and 2,2'-azobis (2-methyl-N-(2-hydroxyethyl) propionamide). In some embodiments acid initiators may be preferred.

Generally, the initiator should be present in the polymerizable organic monomer composition in an amount sufficient to initiate polymerization of the water-soluble polymerizable organic monomer(s). In certain embodiments of the present invention, the initiator may be present in the polymerizable organic monomer composition in an amount in the range of from about 0.1% to about 5% by weight of the water-soluble polymerizable organic monomer; preferably, from about 0.3% to about 4%, preferably from about 0.5% to about 3%. One skilled in the art, with the benefit of this disclosure, will recognize that as the polymerization temperature increases, the required level of activator decreases.

In some embodiments, it may be desirable to include a supplemental initiator based, for example, of the temperatures to which the polymerizable organic monomer composition will be subjected. For example, where the immature aqueous gel is placed into a subterranean formation that is relatively cool as compared to the surface mixing temperature (such as when placed below the mud line in offshore operations), it may be desirable to include a compound to, in effect, initiate the initiator. This supplemental initiator may be any suitable water-soluble compound or compounds that can react with the initiator to provide free radicals at a lower temperature. An example of a suitable secondary initiator is triethanolamine. In some embodiments of the present invention, the secondary initiator is present in the polymerizable organic monomer composition in an amount in the range of from about 0.1% to about 5% by weight of the water-soluble polymerizable organic monomer(s); preferably, from about 0.3% to about 4%, preferably from about 0.5% to about 3%.

4. Suitable Organosilane Coupling Agents

The organosilane coupling agent component of the polymerizable organic monomer compositions generally may comprise any organosilane coupling agent, as defined above. Examples of suitable organosilane coupling agents include, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes, aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; and gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-β (aminoethyl)-raminopropyl-trimethoxysilane; N-beta (aminoethyl)-raminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; Vinyltrichlorosilane; Vinyltris (βmethoxyethoxy) silane; Vinyltrimethoxysilane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta (aminoethyl)-raminopropyltrimethoxysilane; N-beta (aminoethyl)-raminopropylmethyldimethoxysilane; r-aminopropyltriethoxysilane; N-phenyl-raminopropyltrimethoxysilane; r-mercaptopropyltrimethoxysilane; r-chloropropyltrimethoxysilane and combinations thereof.

In some embodiments of the present invention, the organosilane coupling agent is present in the polymerizable organic monomer composition in an amount in the range of from about 0.1% to about 3% by weight of the water-soluble polymerizable organic monomer(s); preferably, from about 0.5% to about 2%.

5. Suitable Oxygen Scavengers

The presence of oxygen in these embodiments of the polymerizable organic monomer composition may inhibit the polymerization process of the water-soluble polymerizable organic monomer or monomers. Therefore, an oxygen scavenger, such as stannous chloride, may be included in the polymerizable monomer composition. In order to improve the solubility of stannous chloride so that it may be readily combined with the polymerizable organic monomer composition on the fly, the stannous chloride may be predissolved in a hydrochloric acid solution. For example, the stannous chloride may be dissolved in a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from about 0.1% to about 10% by weight of the polymerizable organic monomer composition. Generally, the stannous chloride may be included in the polymerizable organic monomer composition of the present invention in an amount in the range of from about 0.005% to about 0.1% by weight of the polymerizable organic monomer composition.

6. Suitable Crosslinking Agents

Also optionally, the polymerizable organic monomer compositions of the present invention may further comprise a crosslinking agent for crosslinking the polymerizable organic monomer compositions in the desired gelled substance. In some embodiments, the crosslinking agent is a molecule or complex containing a reactive transition metal cation. A suitable crosslinking agent comprises trivalent chromium cations complexed or bonded to anions, atomic oxygen, or water. Examples of suitable crosslinking agents include, but are not limited to, compounds or complexes containing chromic acetate and/or chromic chloride. Other suitable transition metal cations include chromium VI within a redox system, aluminum III, iron II, iron III, and zirconium IV. Generally, the crosslinking agent may be present in polymerizable organic monomer compositions in an amount in the range of from 0.01% to about 5% by weight of the polymerizable organic monomer composition; preferably, from about 0.03% to about 4%, preferably from about 0.05% to about 3%.

G. Form of Consolidating Material

Regardless of the consolidation material chosen, its viscosity should preferably be controlled to ensure that it is able to sufficiently penetrate into the surfaces of the subterranean formation. A preferred depth of treatment may be from about one to about three well bore diameters; however, the laminate and/or non-uniform makeup of the formation, i.e. shale-sandstone-shale-sandstone, etc., may make reaching such a depth unrealistic. In some embodiments of the present invention, the consolidation fluid penetrates at least about 0.5 inches into the walls of the well bore, preferably, at least about 1 inch, preferably, at least about 2 inches into the walls of the well bore.

The type and amount of consolidating material included in a particular method of the present invention may depend upon, among other factors, the composition and/or temperature of the subterranean formation, the chemical composition of formations fluids, the flow rate of fluids present in the formation, the composition of the drilling fluid, the effective porosity and/or permeability of the subterranean formation, pore throat size and distribution, and the like. Furthermore, the concentration of the consolidating material can be varied to, among other things, enhance bridging so as to provide for a more rapid coating of the consolidating material, or to minimize bridging so as to allow deeper penetration into the subterranean formation. It is within the ability of one skilled in the art, with the benefit of this disclosure, to determine the type and amount of consolidating material to include in the drilling fluids of the methods of the present invention to achieve the desired results. The amount of fluid loss, and thus depth of penetration, depends on the many factors, including delta pressure, formation permeability, fluid viscosity, particle size, and concentration of fluid loss control or bridging agent.

The consolidating materials suitable for use in the methods of the present invention may be provided in any suitable form, including solid (such as particulate), liquid, foam, or emulsion. In those embodiments where the consolidating material is provided in a particle form, the size of the particle can vary widely. In some embodiments, the consolidating material particles may have an average particle diameter of about 0.001 microns to about 20 microns. In some embodiments, the consolidating material particles may have an average particle diameter of about 0.01 microns to about 10 microns. In some embodiments, the consolidating material particles may have an average particle diameter of about 0.1 microns to about 1 microns. The size distribution of the consolidating material particles used in a particular composition or method of the invention may depend upon several factors, including, but not limited to, the size distribution of the particulates present in the subterranean formation, the effective porosity and/or permeability of the subterranean formation, pore throat size and distribution, and the like. For example, in some embodiments, it may be desirable to use a consolidating material particle with a size distribution such that the consolidating material particles are placed at contact points between formation particulates. That is the size distribution of the consolidating material particles may be controlled within a size range smaller than the average pore size of the formation to promote deeper penetration of the consolidating material particles through a body of unconsolidated particulates or in low permeability formations.

In other embodiments, the size distribution of the consolidating material particles may be within a larger range, e.g. of about 30 μm to about 300 μm. It may be desirable in some embodiments to provide consolidating material particles with a larger particle size distribution to, among other things, promote the filtering out of consolidating material particles at or near the spaces between neighboring unconsolidated particulates or in high permeability formations. A person of ordinary skill in the art, with the benefit of this disclosure, will be able to select an appropriate particle size distribution for the consolidating material particles suitable for use in the present invention and will appreciate that the methods of creating certain sized consolidating material particles are well known in the art.

III. Optional Relative Permeability Modifiers

In some embodiments, the drilling fluids of the present invention may comprise a relative permeability modifier. In general, suitable relative permeability modifiers may be any of a variety of compounds that are capable of selectively reducing the effective permeability of a formation to water-based fluids without a comparable reduction of the formation's effective permeability to hydrocarbons. Suitable relative permeability modifiers generally include water-soluble polymers that attach to surfaces within the formation, reducing the water permeability without a comparable reduction in hydrocarbon permeability. As used in this disclosure, "water soluble" refers to at least about 0.01 weight percent soluble in distilled water at room temperature (about 72° F.). In certain embodiments, the water-soluble polymer is at least about 0.45 weight percent soluble in distilled water at room temperature. In certain embodiments, the water-soluble polymer is at least about 0.6 weight percent soluble in distilled water at room temperature.

Those of ordinary skill in the art, with the benefit of this disclosure, will appreciate that a variety of different water-soluble polymers may be suitable for use as the relative permeability modifiers. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

In addition, water-soluble polymers suitable for use as relative permeability modifiers also may include hydrophobically modified polymers. As used in this disclosure, the terms "hydrophobically modified," "hydrophobic modification," and the like refer to the incorporation into the hydrophilic polymer structure of hydrophobic groups, wherein the alkyl chain length is about 4 to about 22 carbons. While these hydrophobically modified polymers have hydrophobic groups incorporated into the hydrophilic polymer structure, they should remain water soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Example hydrophobically modified polymers may contain a hydrophilic polymer backbone and a hydrophobic branch, wherein the hydrophobic branch includes an alkyl chain of about 4 to about 22 carbons. In certain embodiments, the hydrophobic branch may have an alkyl chain length of about 7 to about 22 carbons. In certain embodiments, the hydrophobic branch may have an alkyl chain length of about 12 to about 18 carbons.

Additional examples of suitable hydrophobically modified polymers include a polymer that has been hydrophobically modified with an alkyl group present on an amino group (in the polymer backbone or as a pendant group) in quaternized form. For example, an alkyl group may be present on a dialkyl amino pendant group in quaternized form. In one embodiment, the dialkyl amino pendant group comprises a dimethyl amino pendant group. One specific example of a hydrophobically modified polymer includes a polydimethylaminoethylmethacrylate or polydimethylaminopropylmethacrylamide that has been hydrophobically modified with an alkyl group with 4 carbons to 22 carbons (e.g., 4 carbons, 6, carbons, 8 carbons, 10 carbons, 12 carbons, 14 carbons, 16 carbons, 18 carbons, 20 carbons, 22 carbons, etc.) on a dimethylamino group. An example of a suitable hydrophobically modified polymer is HPT-1™ relative permeability modifying polymer available from Halliburton Energy Services, Inc., Duncan, Okla.

Examples of suitable hydrophobically modified polymers that may be utilized include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another example of a suitable hydrophobically modified polymer comprises an amino methacrylate/alkyl amino methacrylate copolymer. An example of a suitable amino methacrylate/alkyl amino methacrylate copolymer includes a dimethylaminoethyl methacrylate/alkyl-dimethylammoniumethyl methacrylate copolymer. An example of a suitable dimethylaminoethyl methacrylate/alkyl-dimethylammoniumethyl methacrylate copolymer includes a dimethylaminoethyl methacrylate/hexadecyl-dimethylammoniumethyl methacrylate copolymer. As discussed in more detail below, these copolymers may be formed, in embodiments, by reactions with a variety of alkyl halides. For example, in some embodiments, the hydrophobically modified polymer may comprise a dimethylaminoethyl methacrylate/hexadecyl-dimethylammoniumethyl methacrylate bromide copolymer.

Example hydrophobically modified polymers may be synthesized utilizing any suitable technique. For example, the hydrophobically modified polymers may be a reaction product of a reaction comprising a hydrophilic polymer and a hydrophobic compound. By way of further example, the hydrophobically modified polymers may be prepared from a polymerization reaction comprising a hydrophilic monomer and a hydrophobically modified hydrophilic monomer. In certain embodiments, the hydrophobically modified polymers may be pre-reacted before they are placed into the well bore. Alternatively, in some embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer via reaction with a hydrophobic compound. As described above, hydrophobic modification refers to incorporation into the hydrophilic polymer structure of hydrophobic groups, wherein the alkyl chain length is from about 4 to about 22 carbons. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), poly(methacrylic acid/dimethylaminopropyl methacrylamide), and combinations thereof. In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments, the hydrophilic polymers comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one embodiment, the starch is a cationic starch. A suitable cationic starch may be formed by reacting a starch, such as corn, maize, waxy maize, potato, tapioca, or the like, with the reaction product of epichlorohydrin and trialkylamine.

The hydrophobic compounds that are capable of reacting with the hydrophilic polymers include alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to, acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

A variety of hydrophobically modified hydrophilic monomers also may be used to form the hydrophobically modified polymers useful in certain embodiments. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

In addition, water-soluble polymers suitable for use as relative permeability modifiers also may include hydrophilically modified polymers. As used in this disclosure, the terms "hydrophilic modification," "hydrophilically modified," and the like refer to the incorporation into the hydrophilic polymer structure of hydrophilic groups, such as to introduce branching or to increase the degree of branching in the hydrophilic polymer. The hydrophilically modified polymers of certain embodiments typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. In certain embodiments, suitable hydrophilically modified polymers may be formed by additional hydrophilic modification, for example, to introduce branching or to increase the degree of branching, of a hydrophilic polymer. Those of ordinary skill in the art, with the benefit of this disclosure, will be able to determine other suitable methods for the preparation of suitable hydrophilically modified polymers.

The hydrophilic polymers suitable for forming the hydrophilically modified polymers used in certain embodiments should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

Hydrophilic compounds suitable for reaction with the hydrophilic polymers include, but are not limited to: polyethers that comprise halogens; sulfonates; sulfates; organic acids; and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Examples of suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

In some embodiments, the relative permeability modifier may be dissolved in an aqueous carrier fluid comprising water, seawater, or an aqueous salt solution. In some embodiments, the aqueous salt solution may contain one or more salts such as potassium chloride, sodium chloride, ammonium chloride, and calcium chloride, in an amount in the range of 2% to about 10% by weight of the aqueous salt solution.

In accordance with some embodiments, the relative permeability modifier may be present in the drilling fluid in a sufficient concentration to provide the desired level of permeability modification. In some embodiments, the relative permeability modifier may be present in the drilling fluids in an amount in the range of from about 0.02% to about 10% by weight of the drilling fluid. In another embodiment, relative permeability modifier may be present in the drilling fluid in an amount in the range of from about 0.05% to about 1.0% by weight of the drilling fluid. In certain embodiments, the relative permeability modifier may be provided in a concentrated aqueous solution prior to its combination with the other components necessary to form the permeability modifying fluids.

IV. Methods of the Present Invention

One embodiment of a method of the present invention provides a method of drilling a well bore with a drilling composition comprising a drilling fluid component and a consolidating material component, and allowing the consolidating material to penetrate into the walls of the well bore.

Another embodiment of a method of the present invention provides a method of consolidating a subterranean formation surrounding a well bore comprising the steps of drilling a well bore with a drilling composition comprising a drilling fluid component and a consolidating material component, and allowing the consolidating material to penetrate into the subterranean formation surrounding the well bore.

Another embodiment of a method of the present invention provides a method of consolidating a subterranean formation surrounding a well bore comprising the steps of drilling a well bore with a drilling composition comprising a drilling fluid component, a consolidating material component, and a relative permeability modifier, and allowing the consolidating material to penetrate into the subterranean formation surrounding the well bore.

Another embodiment of a method of the present invention provides a method of consolidating a subterranean formation surrounding a well bore comprising the steps of drilling a well bore with a drilling composition comprising a drilling fluid component and a consolidating material component comprising a polymerizable organic monomer composition, and allowing the consolidating material to penetrate into the subterranean formation surrounding the well bore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of consolidating formation particulates surrounding a well bore comprising the steps of:
   providing a drilling composition comprising a drilling fluid and a consolidating material wherein the consolidating material is selected from the group consisting of a non-epoxy based resin, a non-aqueous tackifying material, an aqueous tackifying material, a silyl-modified polyamide, a crosslinkable carboxylate polymer composition, a crosslinkable acrylamide polymer composition or a combination thereof;
   using the drilling composition to drill at least a portion of the well bore;
   allowing the consolidating material in the drilling composition to penetrate into the walls of the well bore; and allowing the consolidating material in the drilling composition to consolidate at least a portion of the formation particulates surrounding the well bore.

2. The method of claim 1 wherein the consolidating material has a viscosity of less than about 100 cP.

3. The method of claim 1 wherein the consolidating material comprises:
   a hardenable resin component that comprises a hardenable resin; and
   a liquid hardening agent component that comprises a hardening agent, a silane coupling agent, and a surfactant.

4. The method of claim 3 wherein the consolidating material comprises:
   from about 5% to about 30% phenol;
   from about 40% to about 70% phenol formaldehyde;
   from about 10 to about 40% furfuryl alcohol;
   from about 0.1% to about 3% of a silane coupling agent; and
   from about 1% to about 15% of a surfactant.

5. The method of claim 3 wherein the hardening agent in the liquid hardening agent component comprises at least one hardening agent selected from the group consisting of: an amine, an aromatic amine, an aliphatic amine, a cyclo-aliphatic amine, piperidine, triethylamine, benzyldimethylamine, N,N-dimethylaminopyridine, 2-(N$_2$N-dimethylaminomethyl)phenol, and tris(dimethylaminomethyl)phenol.

6. The method of claim 3 wherein the silane coupling agent in the liquid hardening agent component comprises at least one silane coupling agent selected from the group consisting of: N-2-(aminoethyl)-3-aminopropyltrimethoxysilane, 3-glycidoxypropyltrimethoxysilane, and n-beta-(aminoethyl)-gamma-aminopropyl trimethoxysilane.

7. The method of claim 3 wherein the surfactant in the liquid hardening agent component comprises at least one surfactant selected from the group consisting of: an ethoxylated nonyl phenol phosphate ester, a mixture of one or more cationic surfactants, a $C_{12}$-$C_{22}$ alkyl phosphonate surfactant, and a mixture of one or more non-ionic surfactants and an alkyl phosphonate surfactant.

8. The method of claim 3 wherein the hardenable resin comprises at least one furan-based resin selected from the group consisting of: furfuryl alcohol, a mixture of furfuryl alcohol with an aldehyde, and a mixture of a furan resin and a phenolic resin.

9. The method of claim 1 wherein the consolidating material comprises at least one phenolic-based resin selected from the group consisting of: a terpolymer of phenol, a phenolic formaldehyde resin, and a mixture of a phenolic and a furan resin.

10. The method of claim 1 wherein the consolidating material further comprises at least one HT epoxy-based resin selected from the group consisting of: a bisphenol A-epichlorohydrin resin, a polyepoxide resin, a novolac resin, a polyester resin, and a glycidyl ether.

11. The method of claim 1 wherein the consolidating material is a crosslinkable carboxylate polymer composition, a crosslinkable acrylamide polymer composition, or a combination thereof and wherein the consolidation material further comprises an initiator.

12. The method of claim 11 wherein the polymerizable organic monomer further comprises at least one polymerizable organic monomer selected from the group consisting of furfuryl alcohol, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidepropyltriethylammonium chloride, N-vinyl pyrrolidone, vinyl-phosphonic acid, methacryloyloxyethyl trimethylammonium sulfate, hydroxyethylcellulose-vinyl phosphoric acid, hydroxyethylacrylate, hydroxymethylacrylate, hydroxyethylmethacrylate, N-hydroxymethylacrylamide, N-hydroxymethyl-methacrylamide, polyethylene glycol acrylate, polyethylene glycol methacrylate, polypropylene glycol acrylate, and polypropylene glycol methacrylate.

13. The method of claim 11 wherein the initiator comprises at least one initiator selected from the group consisting of: an alkali metal persulfate, a peroxide, an oxidation-reduction system employing a reducing agent, an acid initiator, and an azo polymerization initiator.

14. The method of claim 11 wherein the polymerizable organic monomer composition further comprises at least one additive selected from the group consisting of: an oxygen scavenger, an organosilane coupling agent, and a crosslinking agent.

15. The method of claim 1 wherein the drilling composition further comprises a fluid loss control material.

16. The method of claim 1 wherein the drilling composition further comprises a relative permeability modifier.

17. A method of consolidating formation particulates surrounding a well bore comprising the steps of:
   providing a drilling composition comprising a drilling fluid, a consolidating material, and a relative permeability modifier; wherein the consolidating material is selected from the group consisting of a non-epoxy based resin, a non-aqueous tackifying material, an aqueous tackifying material, a silyl-modified polyamide, a crosslinkable carboxylate polymer composition, a crosslinkable acrylamide polymer composition or a combination thereof;
   using the drilling composition to drill at least a portion of the well bore;
   allowing the consolidating material in the drilling composition to penetrate into the walls of the well bore; and
   allowing the consolidating material in the drilling composition to consolidate at least a portion of the formation particulates surrounding the well bore.

18. A method of consolidating formation particulates surrounding a well bore comprising the steps of:
   providing a drilling composition comprising a drilling fluid, a consolidating material comprising a polymerizable organic monomer composition; wherein the consolidating material is selected from the group consisting of a non-epoxy based resin, a non-aqueous tackifying material, an aqueous tackifying material, a silyl-modified polyamide, a crosslinkable carboxylate polymer composition, a crosslinkable acrylamide polymer composition or a combination thereof;
   using the drilling composition to drill at least a portion of the well bore;
   allowing the consolidating material in the drilling composition to penetrate into the walls of the well bore; and
   allowing the consolidating material in the drilling composition to consolidate at least a portion of the formation particulates surrounding the well bore.

* * * * *